(12) United States Patent
Salaka et al.

(10) Patent No.: US 9,697,283 B2
(45) Date of Patent: Jul. 4, 2017

(54) CATEGORY CONSTRAINED QUERIES

(71) Applicant: PayPal, Inc., San Jose, CA (US)

(72) Inventors: Vamsi Krishna Salaka, Fremont, CA (US); Prathyusha Senthil Kumar, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 323 days.

(21) Appl. No.: 14/473,940

(22) Filed: Aug. 29, 2014

(65) Prior Publication Data

US 2015/0081662 A1    Mar. 19, 2015

Related U.S. Application Data

(60) Provisional application No. 61/877,859, filed on Sep. 13, 2013.

(51) Int. Cl.
*G06F 17/30* (2006.01)
*G06Q 30/06* (2012.01)

(52) U.S. Cl.
CPC ... *G06F 17/30864* (2013.01); *G06Q 30/0625* (2013.01)

(58) Field of Classification Search
None
See application file for complete search history.

(56) References Cited

U.S. PATENT DOCUMENTS

| | | | |
|---|---|---|---|
| 8,738,612 B1* | 5/2014 | Tourn | G06F 17/30699 707/723 |
| 2009/0307161 A1* | 12/2009 | Dalal | G06N 99/005 706/12 |
| 2012/0209831 A1* | 8/2012 | Rehman | G06F 17/3053 707/723 |

* cited by examiner

*Primary Examiner* — Hung Q Pham
(74) *Attorney, Agent, or Firm* — Maschoff Brennan (57) ABSTRACT

A user may submit a search query to a search engine. The search engine may process the search query and generate a set of results. Each of the items searched by the search engine may have been pre-assigned to a category in a category tree. Previous interactions by other users with the items after similar queries may have been recorded. The search engine may identify categories based on the distribution of the interacted-with results among the categories. The category tree may be analyzed at different levels, based on the entropy observed at each level. A level with low entropy may be chosen, and categories at that level used to constrain the query.

15 Claims, 7 Drawing Sheets

$$H(X) = \sum_{i=1}^{n} p(x_i)I(x_i) = \sum_{i=1}^{n} p(x_i)\log_b \frac{1}{p(x_i)} = -\sum_{i=1}^{n} p(x_i)\log_b p(x_i)$$

$$p(x_i) = \frac{eng_{x_i}}{\sum_{i=1}^{n} eng_{x_i}}$$

CATEGORY CONSTRAINED QUERIES

RELATED APPLICATION

This application claims the priority benefits of U.S. Provisional Application No. 61/877,859, filed Sep. 13, 2013, which is incorporated in its entirety by reference.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright eBay, Inc. 2014, All Rights Reserved.

TECHNICAL FIELD

The subject matter disclosed herein generally relates to the processing of data. Specifically, the present disclosure addresses systems and methods to constrain queries to categories.

BRIEF DESCRIPTION OF THE DRAWINGS

Some embodiments are illustrated by way of example and not limitation in the figures of the accompanying drawings.

DETAILED DESCRIPTION

Example methods and systems are directed to constraining one or more queries by category. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A user may submit a search query to a search engine (e.g., a search application running on an application server). The search engine processes the search query and generates a set of results. Results generated by different search engines for the same search query may be different. For example, one search engine may be geared to providing image results while another is geared to providing shopping results. Continuing with this example, submitting a search query comprising "purse" to the two engines could result in an image of a purse from the first engine and a link to a purse retailer from the second engine.

The items available to be returned as results by the search engine may be pre-assigned to a category in a category tree (e.g. books in Amazon.com). For a particular search query, the search engine may determine that some results are unlikely to be of interest to the user, based on the distribution of the past user engagement statistics among the categories. The category tree may be analyzed at different levels, based on the entropy observed at each level. A level with low entropy may be chosen, and categories at that level with few interactions may be excluded. For example, if a search for "iPhone" most frequently generates interactions with items in the Phones category and only rarely generates interactions with items in the Phone Accessories category, the Phones category may be a category to be included for the query "iPhone." Alternatively or additionally, the Phone Accessories category may be a category to be excluded for the query "iPhone." This may result in a better experience for the user, in greater engagement with the search engine or the result set by the user, time saved by the user, and greater sales of items provided to the user by the search engine.

The search engine may identify the categories to be included or excluded for a query at the time the query is received, or may identify the categories to be included or excluded for a query ahead of time. When the categories to be included or excluded are identified ahead of time, the categories may be retrieved when a query is received. For example, prior user interactions after submitting a query for "iPhone" may be analyzed each time an "iPhone" query is received, or the analysis may be performed periodically (e.g., daily, weekly, or monthly) and the results merely accessed each time an "iPhone" query is received. Analyzing the prior user interactions with each query may provide more accurate results. Analyzing the prior user interactions ahead of time may provide better performance.

The categories to be included or excluded may be based on the interactions of users after the same query or after similar queries. Two queries are the same if they are treated identically by the search engine. For example, "french toast" and "toast french" may be the same query if the search engine does not distinguish based on word order, but "'french toast'" and "french toast" may be different queries if the search engine treats phrases differently from individual words. Two queries are similar if the category constraint system determines they are similar. A query is similar to itself. The category constraint system may determine that queries are similar if they contain one or more words in common, if the generated result sets overlap by a threshold amount, if users frequently issue one query after the other, and so on. For example, "french toast" and "toast french" may be similar queries if the search engine distinguishes based on word order, and both similar queries and the same query if the search engine does not distinguish based on word order. As another example, 90% of the result sets for "Apple iPhone" and "iPhone" may be the same results. If a threshold for similarity of result sets were set at 80%, the category constraint system may determine that "Apple iPhone" and "iPhone" are similar queries. As a third example, if users frequently search for "android" after searching for "iPhone," then "android" and "iPhone" may be similar queries.

Figure 4:
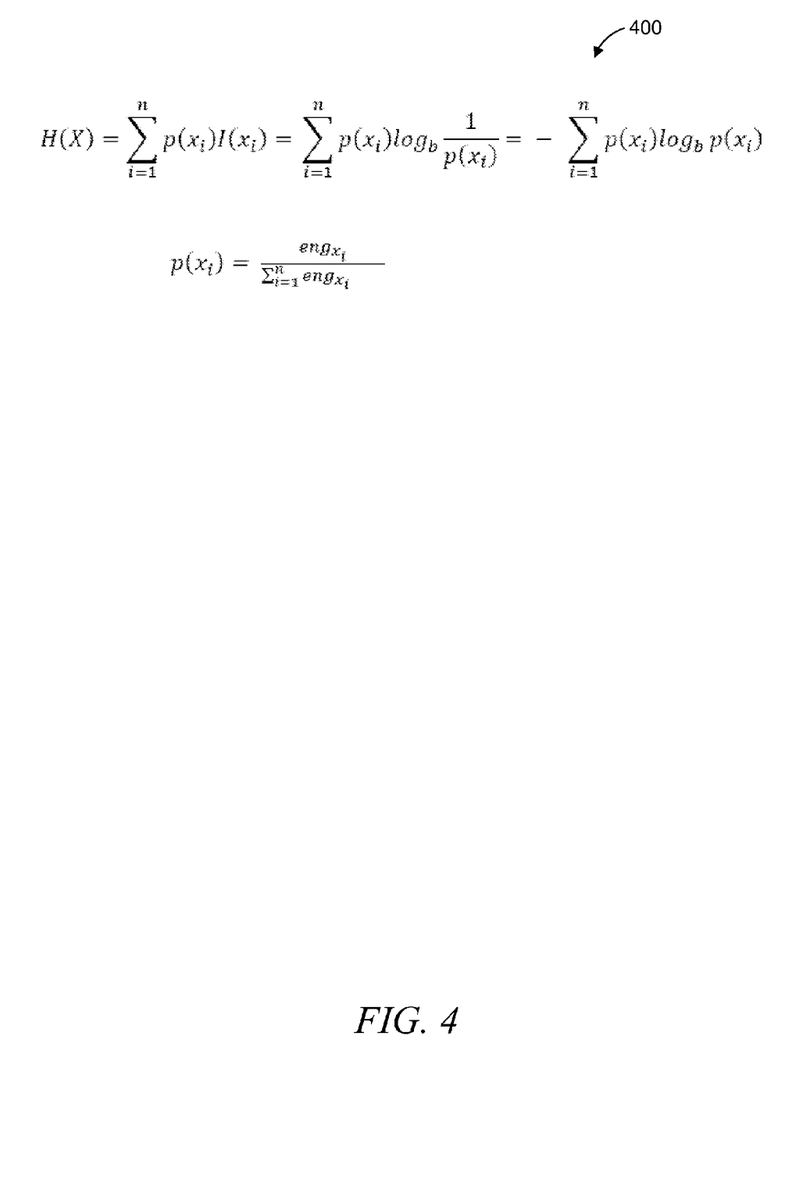
FIG. 4 is an equation illustrating a calculation of a device suitable for constraining queries by category, according to some example embodiments.

Interactions with items may include viewing items, bidding on items, buying items, subscribing to items, sharing the items on social networks. In some example embodiments, only a subset of the interactions are considered. For example, only buying an item may be considered to be an interaction with the item. Additionally, different types of interactions may be considered in a single embodiment. To illustrate, an example embodiment may consider any form of interaction by the current user to be an interaction but consider only purchases by other users to be interactions. Thus, while the description below frequently refers to interactions, the various possible combinations of types of interactions should be recognized as being within the scope of the present invention. In another embodiment, each type of interaction may be associated with a weight that is utilized to compute a probability of a particular result for category $x_i$ (e.g., $p(x_i)$) as shown in FIG. 4). For example, a purchase of an item described by a listing in a category may be associated with a weight of two and a view of an item described by a listing in a category may be associated with a weight of one because a purchase indicates a greater level of interaction or engagement with a category. It follows that purchases may be given greater weight in computing the probability of a particular result or engagement in a category, according to an embodiment.

In another example embodiment, interactions are grouped into categories of relevance and the categories utilized as a basis for determining that an interaction has taken place. An example of a category may be interactions that indicate the end of a shopping session. Interactions that may be included in such a category could include, for example, purchasing an item, performing a new search in a different item category, ending the browsing sessions, navigating to a completely different website, etc.

Figure 1:
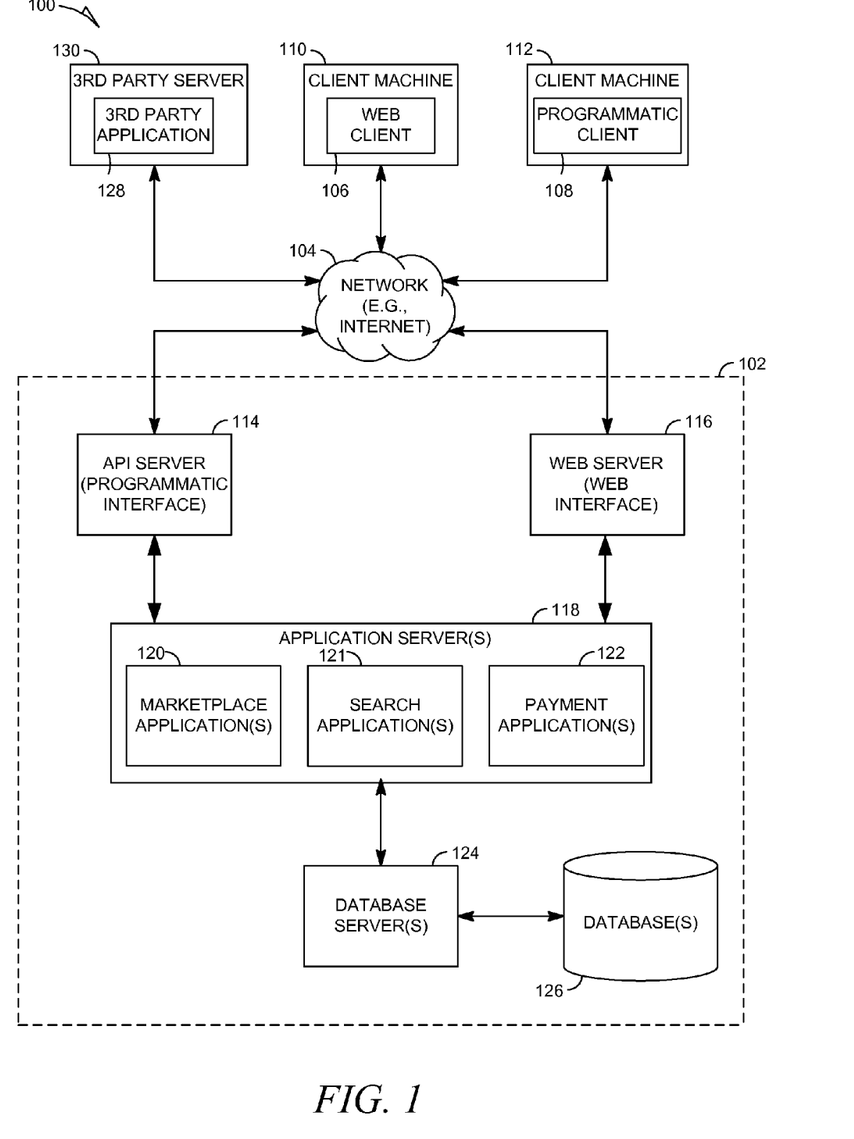
FIG. 1 is a network diagram illustrating a network environment suitable for constraining queries by category, according to some example embodiments.

It will be appreciated that category constraining may be practiced in conjunction with other forms of query rewriting. For example, other forms of query rewriting may include removing stop words, adding synonyms, structuring keywords into name-value pairs that are concatenated as constraints to the query and the like. According to one embodiment, category constraining may be applied to the query after other forms of query rewriting have been performed, FIG. 1 is a network diagram depicting a client-server system 100, within which one example embodiment may be deployed. A networked system 102, in the example forms of a network-based marketplace or publication system, provides server-side functionality, via a network 104 (e.g., the Internet or Wide Area Network (WAN)) to one or more clients. FIG. 1 illustrates, for example, a web client 106 (e.g., a browser), and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more marketplace applications 120, search applications 121, and payment applications 122. The application servers 118 are, in turn, shown to be coupled to one or more databases servers 124 that facilitate access to one or more databases 126.

The marketplace applications 120 may provide a number of marketplace functions and services to users that access the networked system 102. The search applications 121 may provide a number of search functions and services to users that access the networked system 102. The search applications 121 may allow users to submit queries and receive results responsive to the queries. The search applications 121 may be linked to or part of the marketplace applications 120. Accordingly, searches may be run by the search application 121 to find items for sale through the marketplace applications 120. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120. While the marketplace, search, and payment applications 120, 121, and 122 are shown in FIG. 1 to each form part of the networked system 102, it will be appreciated that, in alternative embodiments, the search applications 121 may form part of a search service that is separate and distinct from the networked system 102. Likewise, the payment applications 122 may form part of a payment service that is separate and distinct from the networked system 102.

Further, while the system 100 shown in FIG. 1 employs a client-server architecture, the present invention is of course not limited to such an architecture, and could equally well find application in a distributed, or peer-to-peer, architecture system, for example. The various marketplace, search, and payment applications 120, 121, and 122 could also be implemented as standalone software programs, which do not necessarily have networking capabilities.

The web client 106 accesses the various marketplace, search, and payment applications 120, 121, and 122 via the web interface supported by the web server 116. Similarly, the programmatic client 108 accesses the various services and functions provided by the marketplace, search, and payment applications 120, 121, and 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

The client machine 110 or 112 may present information to a user. For example, the client machine 110 may be running a web browser presenting a web page. The user may indicate a search query to the client machine 110. A search query defines the parameters of a search. A search query may include an alphanumeric string, an image, audiovisual data, or any suitable combination thereof. A search query may include filters that exclude results complying with or not complying with the filter. A search query may be composed of multiple elements. An element is a discrete portion of a search query, such as a word or phrase in an alphanumeric string, an image, or a filter. For example, the user may type a search query into a text field, select an item to search for similar or related items, upload an image to search for similar or related items, or any suitable combination thereof. One item is similar to another if they are substitutes for each other. For example, one television may be similar to another television. An item is related to another if they work together or are frequently purchased together. For example, peanut butter may be related to jelly, or a universal remote control may be related to a television.

The client machine 110 or 112 may submit the search query to an application server 118 running a search application 121. The application server 118 may modify the search query before submitting the modified search query to the item database (e.g., the database 126). Different modifications may be performed and the quality or quantity of the results analyzed. For example, the search query may be modified to search for results within a certain category (e.g., a product category such as books, games, movies, furniture, etc. or a content category such as news, blogs, fiction, opinion, entertainment, and the like) or with a certain attribute (e.g., produced within a certain date range, located within a geographic area, shipped in a certain way, sold in a particular way, etc.). In some example embodiments, the modifications are performed to reduce the amount of noise in the search results (e.g., to reduce the number of unwanted results presented to the user). From the point of view of the user, an unwanted result is a result that, though it may technically match the user's query, actually does not contain the information or item the user was seeking with the search. From the point of view of the predictive system, an unwanted result is a result that is rarely or never interacted with by a user after a particular search. For example, if a user searches for "French toast," local restaurants and recipes may be wanted results, while an article concerning a toast at a wedding in France may be an unwanted result. Based on the analysis of the results, the application server 118 may send the results of one or more of the search queries back to the client machine 110 or 112.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace, search, or payment functions that are supported by the relevant applications of the networked system 102.

Figure 2:
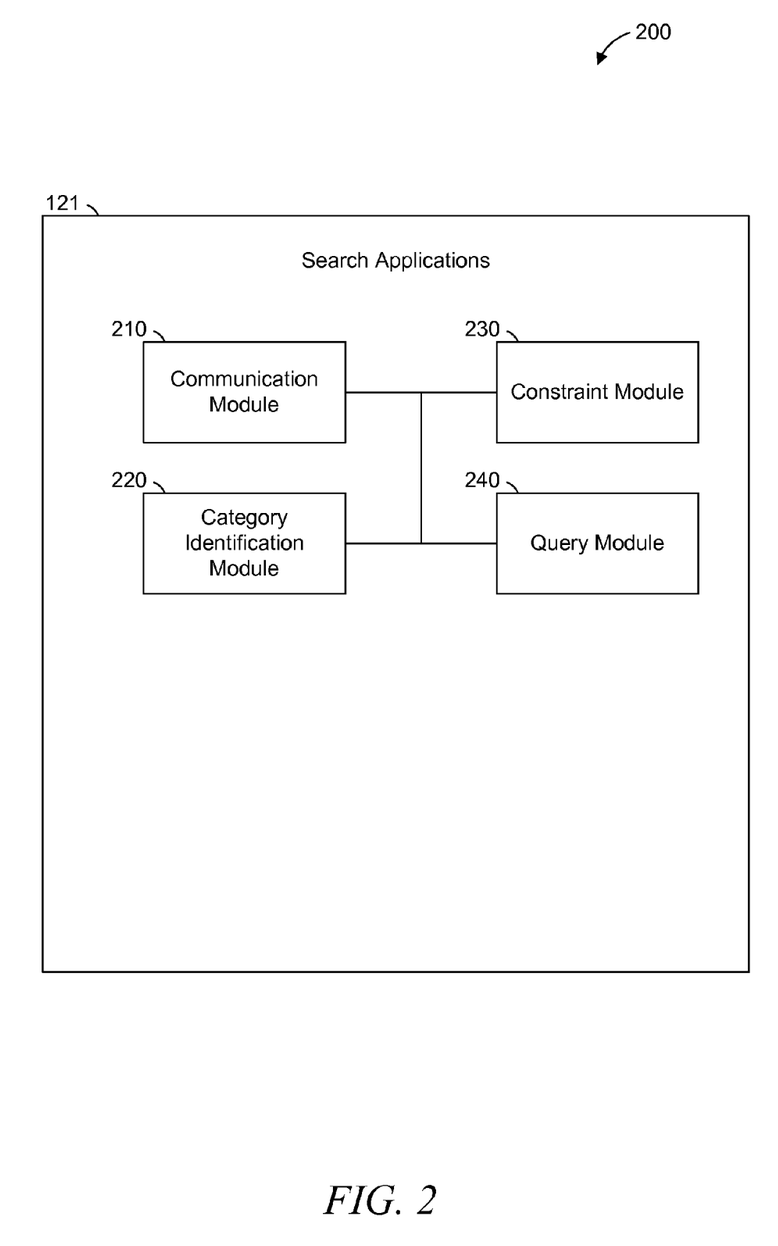
FIG. 2 is a block diagram illustrating search applications suitable for constraining queries by category, according to some example embodiments.

FIG. 2 is a block diagram illustrating search applications 121, according to some example embodiments. The application server 118 is shown as including a communication module 210, a category identification module 220, a constraint module 230, and a query module 240, all configured to communicate with each other (e.g., via a bus, shared memory, a switch, or application programming interfaces (APIs)). Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The communication module 210 may control communication with the client machine 110 and the database 126. The communication module 210 may also send data for storage on the application server 118 or the database 126.

Upon receiving a search query from a user device (e.g., the client machine 110 or the client machine 112), the communication module 210 may send the search query to the category identification module 220 to identify categories of items related to the search query.

The user device may submit the search query to the search application 121 running on the application server 118. The category identification module 220 may determine which categories of items contain results from the user-submitted query. Example categories are product categories such as books, games, movies, furniture, etc. and content categories such as news, blogs, fiction, opinion, entertainment, and the like. Information regarding the result-containing categories may be sent to the constraint module 230.

The constraint module 230 may generate category-constrained queries based on the user query and the results provided by the category identification module 220. A category-constrained query is a query that excludes results outside of specified categories. The constraint module 230 may generate a category-constrained query for a single category identified by the category identification module 220, for various combinations of categories identified by the category identification module 220, for categories related to identified categories as discussed in more detail with respect to FIG. 3 below, or any suitable combination thereof.

The constraint module 230 may submit one or more of the constrained queries it generates to the query module 240 for processing. Based on the results generated by the query module 240, the constraint module 230 may generate new category-constrained queries. In some example embodiments, the constraint module 230 may iteratively identify category constraints without repeatedly executing the queries.

The initial query may return a set of results. Each one of the results may be assigned to one or more categories. The categories may be in a category hierarchy, such as that shown in FIG. 3. Each category of the category hierarchy may contain a percentage of the results. For example, category 310a ("All Categories") may contain 100% of the results. Sub-categories 310b and 310d may, for a particular search, contain 25% and 75% of the results, respectively. Continuing down the category hierarchy, the percentages of results may continue to shrink as the categories become narrower. Each category of the category hierarchy may also be responsible for a percentage of the interactions by prior users. For example, category 310a ("All Categories") may contain 100% of the interactions. Sub-categories 310b and 310d may, for the same search discussed above, contain 90% and 10% of the interactions, respectively. Continuing down the category hierarchy, the percentages of interactions may continue to shrink as the categories become narrower.

The entropy, or noisiness, of a result set with respect to a particular set of categories may be calculated using equation 400 of FIG. 4. In that equation, H(X) represents the total entropy of the distribution, $p(x_i)$ represents the probability of a particular result being in a category. The probability of a particular result being in a category is expressed as engagement (e.g., interactions) for the category divided by the sum or total engagement (e.g., interactions) across all categories, as follows:

$$p(x_i) = \frac{eng_{x_i}}{\sum_{i=1}^{n} eng_{x_i}}$$

Recall that an interaction with an item may include identifying a view of the item, identifying a bid on the item, identifying a purchase of the item, identifying a subscription to the item, identifying a share on the item on a social network, and so forth. Identifying the interaction with the item may, in turn, be registered as an interaction with the category that contains the listing that describes the item. For example, consider three categories including a first category, a second category and a third category. Further consider a first interaction (e.g., purchase) with a first item described by a first listing included in the first category, a second interaction (e.g., bid) with a second item described by a second listing included in the second category, and a third interaction (e.g., view) and fourth interaction (e.g., share on Facebook) with a third item described by a third listing included in the third category. The probability associated with the first category is 25% (e.g., one interaction divided by four interactions). The probability associated with the second category is 25% (e.g., one interaction divided by four interactions) and the probability associated with the third category is 50% (e.g., two interactions divided by four interactions). Categories with no interactions are excluded from the equation. As shown in the second part of the equation, $I(x_i)$ may be represented as the logarithm of the inverse of $p(x_i)$. The base of the logarithm (e.g., the "b" in $\log_b$) determines the units of the entropy value generated. For example, base 2 or base 10 are commonly used, but other bases may be used. After the constraint module 230 has determined the query or queries to use, the communication module 210 may send the results provided by the query module 240 for the resulting query or queries to the client machine 110 or 112, for display to the user.

Figure 3:
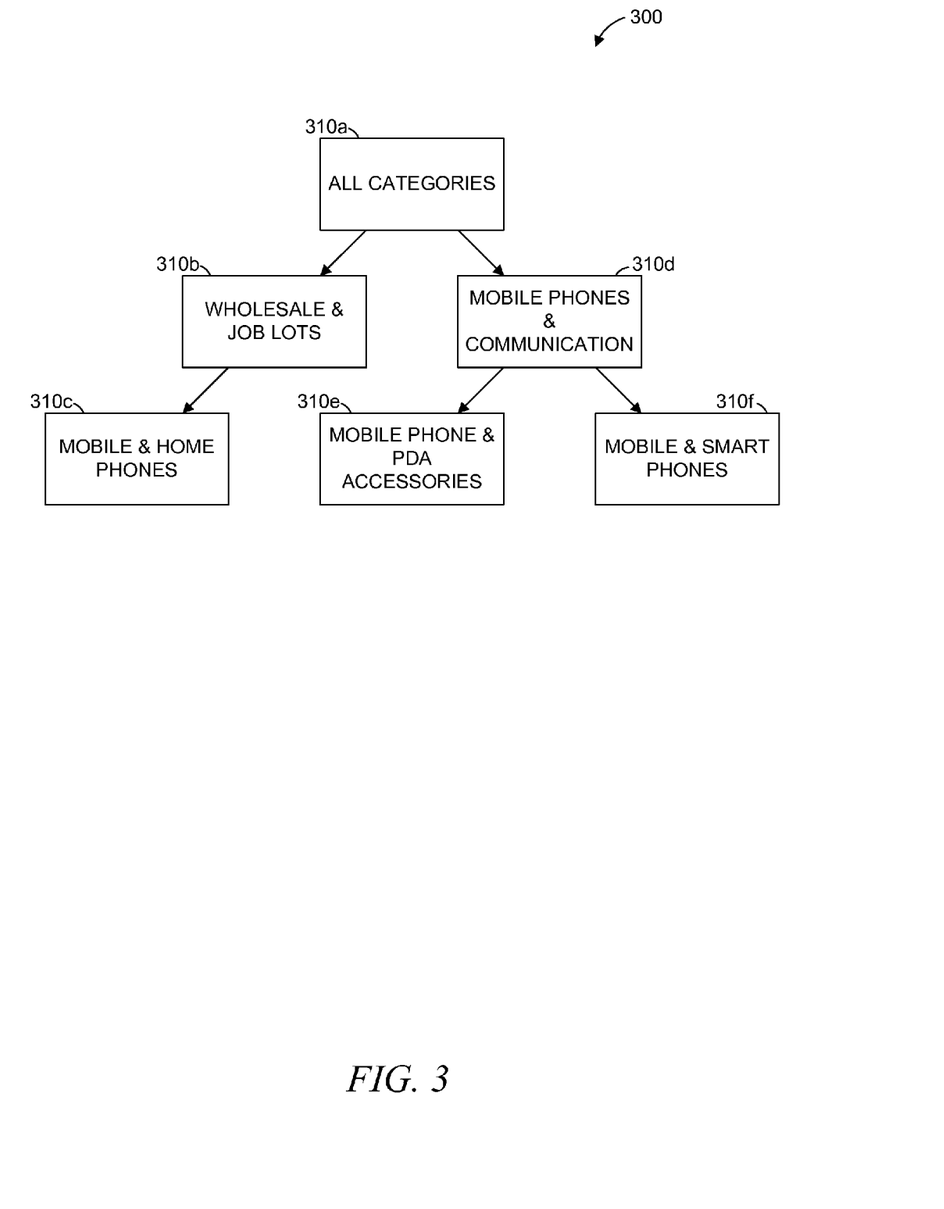
FIG. 3 is a block diagram illustrating a category tree, according to some example embodiments.

FIG. 3 shows a hierarchy of categories 300, according to an embodiment. In the hierarchy of categories 300, each category may have zero or one parent categories and zero or more child categories. Thus, if categories are analyzed beginning at the lowest, most fine-grained level, then "rolled up" by moving up the hierarchy to consider the parent categories of the lowest-level categories, the number of categories under consideration will necessarily not increase. In fact, only in the case that each parent category has only a single child will the number of categories remain the same. Eventually, so long as the hierarchical structure is followed, all lowest-level categories will combine into the single root category, shown as category 310a. According to another embodiment the hierarchy of categories 300 may be embodied as the hierarchy of categories utilized to organize listings on a network-based marketplace such as eBay.com.

FIG. 4 shows equation 400, which may be used to calculate the entropy of a particular distribution of interactions among categories. As can be seen by consideration of equation 400, the entropy of the system when considered from the root category 310a is 0. That is, when all interactions are in categories, and all categories are contained within the root category, the probability of an interaction being in the root category is 100%. When the interaction distribution is considered at lower levels of the hierarchy, the entropy may be higher.

Figure 5:
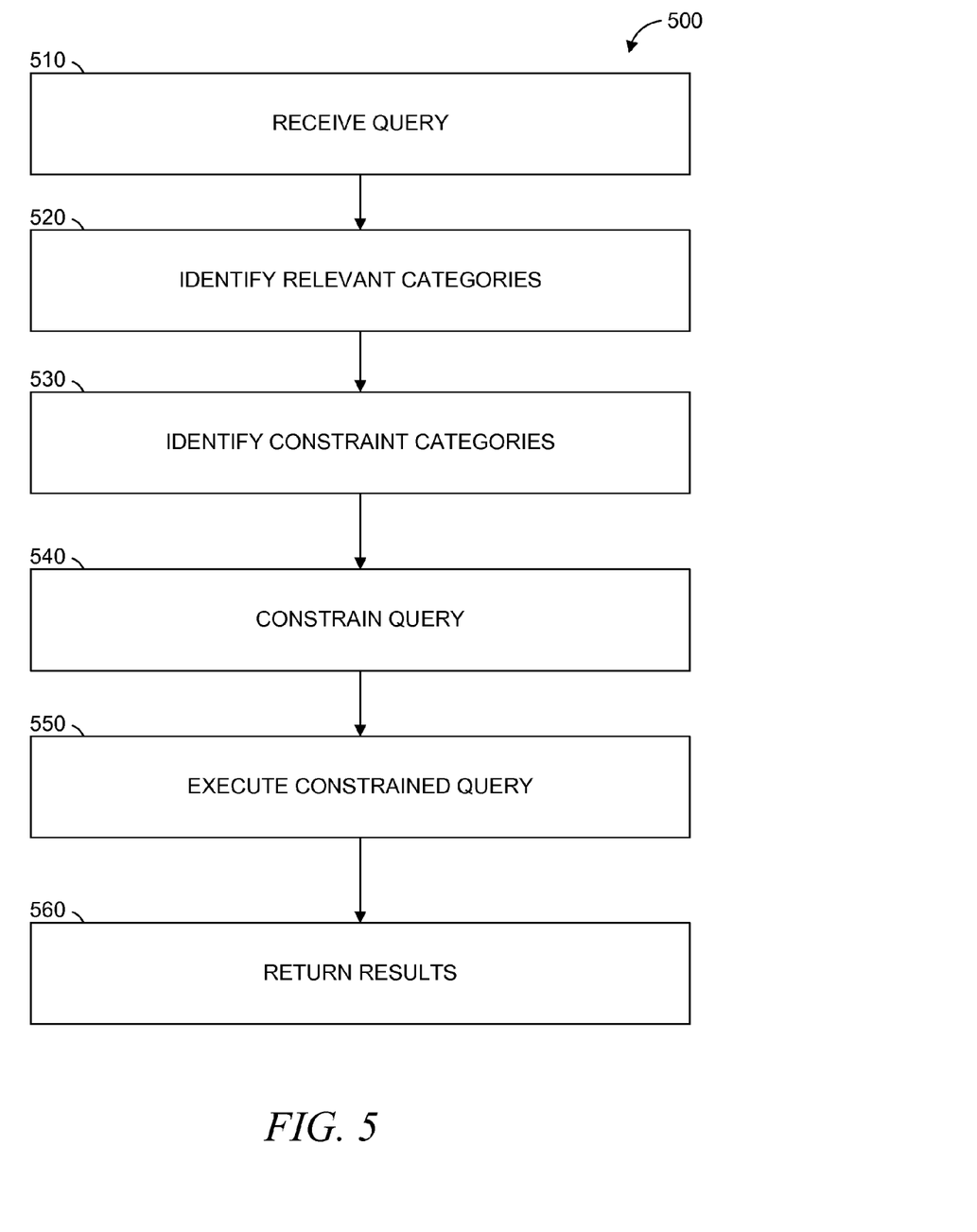
FIGS. 5-6 are flowcharts illustrating operations of an application server in performing a method of constraining queries by category, according to some example embodiments.
Figure 6:
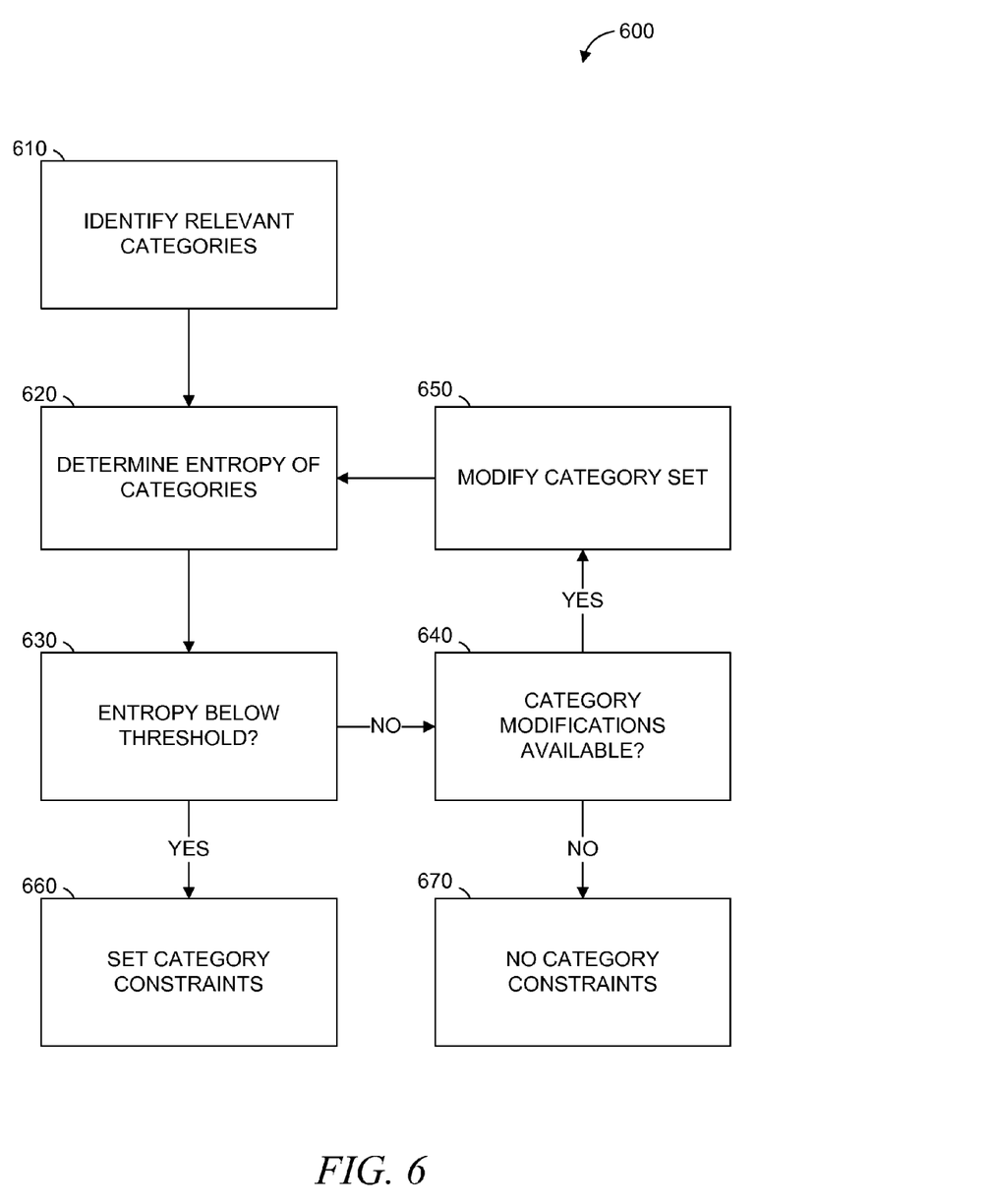

FIGS. 5-6 are flowcharts illustrating operations of the application server 118 in performing methods of constraining search queries, according to some example embodiments. Operations in the methods 500 and 600 may be performed by the search application 121 running on the application server 118, using modules described above with respect to FIG. 2. As shown in FIG. 5, the method 500 includes operations 510, 520, 530, 540, 550, and 560.

The search application 121 may receive a search query (operation 510), e.g., from the client machine 110 or 112 searching for items for sale. The search application 121 may run the query and identify the relevant categories (operation 520), e.g., determine which categories contain results that have been interacted with. Based on the relevant categories, the constraint categories may be determined (operation 530). The determination of the constraint categories may be performed according to the flowchart shown in FIG. 6, discussed below. Once the constraint categories have been identified, the search query may be modified (operation 540) to limit the search results to those results in the constraint categories. The modified search query may be run (operation 550) and the results returned to the client machine 110 or 112 (operation 560).

In some example embodiments, the constraint categories are determined (operations 520 and 530) for multiple queries before the search query is received from the user (operation 510). In these example embodiments, the constraint categories for the query may be stored in a database and retrieved when the search query is received. The search query may then be modified (operation 540) to include the category constraints. The modified search query may be run (operation 550) and the results returned to the client machine 110 or 112 (operation 560).

The method 600, including operations 610, 620, 630, 640, 650, 660, and 670, may be used to determine the constraint categories to use. The search application 121 may run the query and identify the relevant categories along with the number of previous interactions with results in each category (operation 610). Alternatively, the relevant categories and the corresponding numbers of results may have already been identified. The entropy of the result distribution may be calculated (operation 620), for example by using equation 400 (e.g., H(X)). The entropy of the distribution may be compared to an entropy threshold (operation 630). The entropy threshold may be a predetermined value, such as 0.1. If the entropy is below the entropy threshold, then the entropy analysis is complete, and the desired categories may be identified, as discussed in more detail below. If the entropy is above the entropy threshold, then a check is performed to see if additional category modifications are available (operation 640). For example, if a category hierarchy such as that shown in FIG. 3 is being traversed (e.g., "rolled up"), additional category modifications may be available so long as the root node 310a has not yet been reached. If no category modifications are available, but the entropy is still above the threshold, then no category constraints may be used (operation 670).

To modify the category set (operation 650), the current categories may be replaced by their parent categories in the category hierarchy. After the category set is modified, the entropy, H(X), of the new set may be calculated (operation 620), and the procedure repeated. Eventually, either the entropy, H(X), will be below the threshold, or else no category modifications will remain.

When the entropy is below the threshold, the constraints to use may be determined (operation 660). The categories to use may be determined based on filtering rules for including a number of categories, excluding a number of categories, including categories with greater than a threshold percentage of interactions, including categories with greater than a threshold number of interactions, excluding categories with fewer than a threshold percentage of interactions, excluding categories with fewer than a threshold number of interactions, including only the category with the highest probability (e.g., top category) or any suitable combination thereof. For example, all categories with fewer than 5% of interactions may be excluded. As another example, the five categories with the highest percentage of interactions may be used.

As discussed above with respect to FIG. 5, the constraint categories may be used to filter the search results, causing only the results within the constraint categories to be returned to the user.

To illustrate an example, consider a search for "dress." The search query may generate results that have been interacted with by other users with a category distribution as follows: 70% in Women's Clothes, 20% in Children's Clothes, 7% in Men's Clothes, and 3% in Pet Accessories. Applying the equation 400 and using 10 as the base of the logarithm, the entropy of this distribution is about 0.38. This would exceed a threshold of 0.1. Combining categories to go to a higher level in a category hierarchy may generate the following distribution: 97% in Clothes and 3% in Pet Food and Accessories. The entropy of this distribution is about 0.06, an acceptable value when the threshold is 0.1. Accordingly, these categories may be analyzed based on the above mentioned filtering rules to determine which categories to use. For example, if only the top category is used, then results from Clothes will be presented and results from Pet Food and Accessories will be excluded.

According to various example embodiments, one or more of the methodologies described herein may facilitate constraining searches to categories. Hence, one or more the methodologies described herein may facilitate retrieval and presentation of results requested by a user, without including results that are unlikely to be interacted with. One or more of the methodologies described herein may be useful for improving search results in systems that present results using a deterministic sort. A deterministic sort present results by sorting them on a single attribute. For example, results may be sorted by price, by distance from the user, by age, etc. In contrast, a relevance sort presents results according to a ranking based on the relevance of each result to the search query. For example, results that contain words in the search query many times may be ranked higher than results that only contain words in the search query once. When a deterministic sort is used, it may be more important to exclude unwanted results entirely. For example, if unwanted categories of items are excluded from the result set, items in those categories will not appear at the top of the result list regardless of the deterministic sort that is used.

When these effects are considered in aggregate, one or more of the methodologies described herein may obviate a need for certain efforts or resources that otherwise would be involved in searching. Efforts expended by a user in identifying the relevant items may be reduced by one or more of the methodologies described herein. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 7:
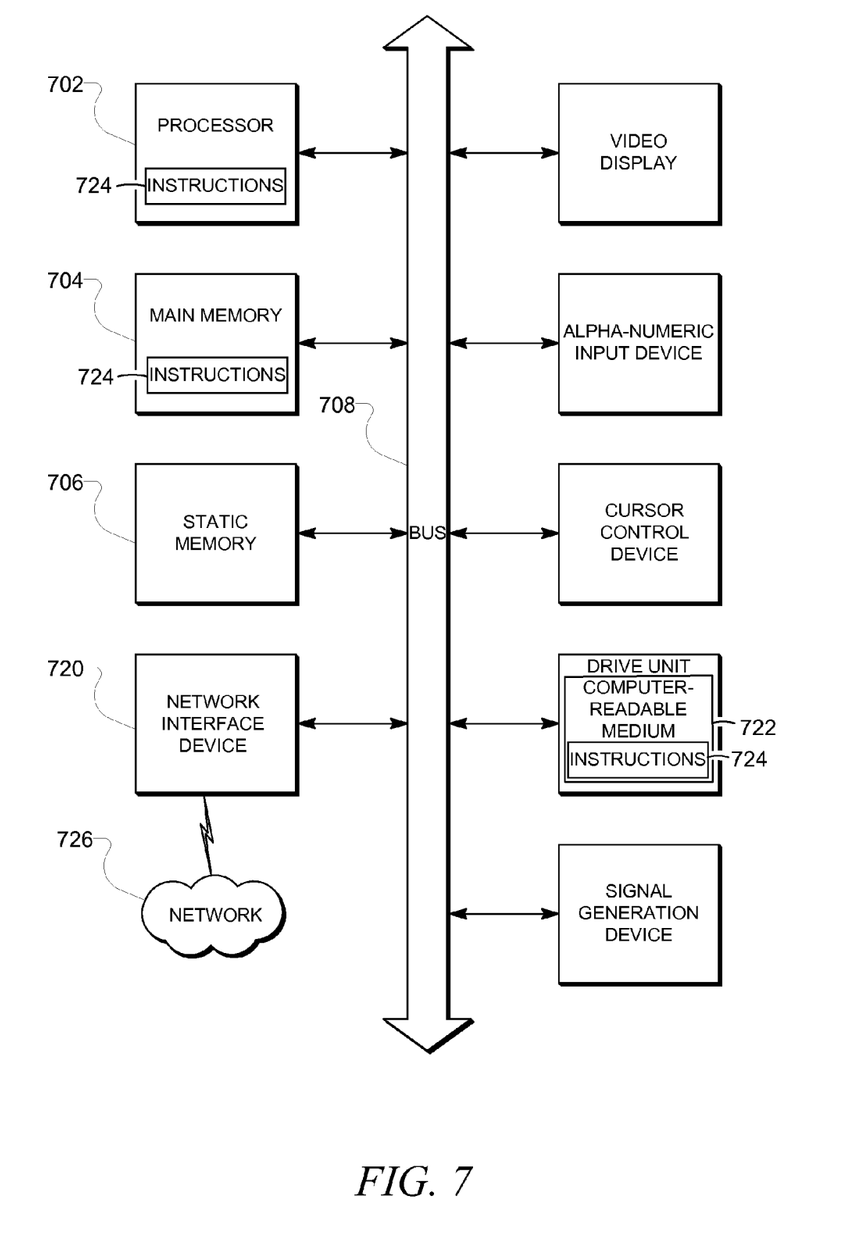
FIG. 7 is a block diagram illustrating components of a machine, according to some example embodiments, able to read instructions from a machine-readable medium and perform any one or more of the methodologies discussed herein.

FIG. 7 is a block diagram of machine in the example form of a computer system 700 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a tablet, a wearable device (e.g., a smart watch or smart glasses), a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard or a touch-sensitive display screen), a user interface (UI) navigation device 714 (e.g., a mouse), a disk drive unit 716, a signal generation device 718 (e.g., a speaker) and a network interface device 720.

Machine-Readable Medium

The disk drive unit 716 includes a machine-readable medium 722 on which is stored one or more sets of instructions and data structures (e.g., software) 724 embodying or utilized by any one or more of the methodologies or functions described herein. The instructions 724 may also reside, completely or at least partially, within the main memory 704 and/or within the processor 702 during execution thereof by the computer system 700, the main memory 704 and the processor 702 also constituting machine-readable media.

While the machine-readable medium 722 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 724 may further be transmitted or received over a communications network 726 using a transmission medium. The instructions 724 may be transmitted using the network interface device 720 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The invention claimed is:

1. A system comprising:
a communication module, implemented using on or more processors, that is configured to receive, over a network from a client machine, a query;
a category identification module, implemented using on or more processors, that is configured to:
identify a first plurality of categories responsive to the query based on prior user interactions after similar queries;
identify an entropy value based on a distribution of the prior user interactions over the first plurality of categories; and
modify the first plurality of categories based on the entropy value to identify a second plurality of categories;
a constraint module, implemented using one or more processors, that is configured to modify the query to include the second plurality of categories as constraints; and
a query module, implemented using one or more processors, that is configured to execute the query to identify search results, the query including the second plurality of categories as constraints, the communication module configured to communicate the search results, over the network, to the client machine.

2. The system of claim 1, wherein the first plurality of categories includes categories within a tree of categories.

3. The system of claim 2, wherein the category identification module is further configured to modify the first plurality of categories, based on the entropy value in excess of a minimum threshold, to generate the second plurality of categories by replacement of at least one category of the first plurality of categories with a parent of the at least one category in the tree of categories.

4. The system of claim 1, wherein the prior user interactions include a first prior user interaction and a second prior user interaction and wherein the first plurality of categories includes a first category and a second category.

5. The system of claim 4, wherein the first prior user interaction includes purchasing an item that is described by the first listing that is included in the second category.

6. The system of claim 4, wherein the second prior user interaction includes viewing an item that is described by the second listing that is included in the second category.

7. The system of claim 4, wherein the first prior user interaction has a weight that is greater than the second prior user interaction.

8. A method comprising:
receiving, over a network from a client machine, a query;
identifying a first plurality of categories responsive to the query based on prior user interactions after similar queries;
identifying an entropy value based on a distribution of the prior user interactions over the first plurality of categories; and
modifying the first plurality of categories based on the entropy value to identify a second plurality of categories;
modifying the query to include the second plurality of categories as constraints;
executing the query to identify search results, the query including the second plurality of categories as constraints; and
communicating the search results, over the network, to the client machine.

9. The method of claim 8, wherein the first plurality of categories includes categories within a tree of categories.

10. The method of claim 9, wherein modifying the first plurality of categories comprises:
based on the entropy value exceeding a minimum threshold, modifying the first plurality of categories to generate the second plurality of categories by replacing at least one category of the first plurality of categories with a parent of the at least one category in the tree of categories.

11. The method of claim 8, wherein the prior user interactions include a first prior user interaction and a second prior user interaction and wherein the first plurality of categories includes a first category and a second category.

12. The method of claim 11, wherein the first prior user interaction includes purchasing an item that is described by the first listing that is included in the second category.

13. The method of claim 11, wherein the second prior user interaction includes viewing an item that is described by the second listing that is included in the second category.

14. The method of claim 8, wherein the identifying the entropy value includes generating the entropy value based on the first prior user interaction having a weight that is greater than the second prior user interaction.

15. A non-transitory machine-readable storage medium comprising instructions that, when executed by one or more processors of a machine, cause the machine to perform operations comprising:
   receiving, over a network from a client machine, a query;
   identifying a first plurality of categories responsive to the query based on prior user interactions after similar queries;
   identifying an entropy value based on a distribution of the prior user interactions over the first plurality of categories; and
   modifying the first plurality of categories based on the entropy value to identify a second plurality of categories;
   modifying the query to further include the second plurality of categories as constraints;
   executing the query to identify search results, the query including the second plurality of categories as constraints; and communicating the search results, over the network, to the client machine.

* * * * *